United States Patent [19]
Bullard et al.

[11] 3,845,356
[45] Oct. 29, 1974

[54] PROCESS CONTROL SYSTEM FOR HAZARDOUS AREAS

[75] Inventors: Alvan H. Bullard, Norfolk; William Calder, III, Foxboro, both of Mass.

[73] Assignee: The Foxboro Company, Foxboro, Mass.

[22] Filed: Jan. 15, 1973

[21] Appl. No.: 323,496

Related U.S. Application Data

[63] Continuation of Ser. No. 241,545, April 6, 1972, abandoned.

[52] U.S. Cl. ............. 317/20, 317/16, 317/18 C, 317/31, 317/33 SC, 317/40 A
[51] Int. Cl. ............................................. H02h 3/20
[58] Field of Search.......... 317/18 C, 18 D, 16, 31, 317/33 SC, 40 A, 20; 128/2.1 R

[56] References Cited
UNITED STATES PATENTS

| | | | |
|---|---|---|---|
| 3,167,685 | 1/1965 | Bade et al. | 317/16 X |
| 3,365,616 | 1/1968 | Hermann | 317/14 R |
| 3,614,539 | 10/1971 | Hallenbeck | 317/99 |
| 3,624,449 | 11/1971 | Morgan | 317/16 |
| 3,631,264 | 12/1971 | Morgan | 317/16 X |

Primary Examiner—James D. Trammell
Attorney, Agent, or Firm—Norman E. Brunell

[57] ABSTRACT

A process control system including: controlling, recording and display devices in a control room area; field equipment, cooperating with the process to be controlled, in a hazardous area; and sources of power; wherein the system configuration provides sufficient protection against transmission of dangerous levels of power along the connections to the hazardous area to prevent ignition. The system includes a single bidirectional voltage limiting barrier and a plurality current limiting devices for all the signal paths leading to the hazardous area thereby eliminating the need for individual barrier devices in each lead connected to the hazardous area.

10 Claims, 2 Drawing Figures

PROCESS CONTROL SYSTEM FOR HAZARDOUS AREAS

CROSS REFERENCE TO RELATED APPLICATION

This is a continuation of Application Ser. No. 241,545, filed Apr. 6, 1972, now abandoned.

BACKGROUND OF THE INVENTION

1. Field of the Invention

This invention relates to barrier devices used in conjunction with process control equipment to prevent ignition in the process or field area due to faults in electrical equipment associated with the field area.

There is widespread use in various process industries of electrical systems for monitoring and controlling the processes. These systems consist of instruments in the process or field area connected by cable to a control room area containing the power sources and the recording, display and controlling instruments. In many cases the field equipment is located in areas where inflammable gases or vapors constitute a potential hazard. It is necessary, therefore, to take precautions to insure that any hazardous area within the field area is safe from the danger of explosion or fire during the normal operation of such equipment. Additionally, if a fault condition arises in the power source or instruments in the control room area or in the process area, it is necessary to insure that the amount of energy available in the field is sufficiently small so that it cannot cause ignition of the inflammable gases or vapors.

2. Description of the Prior Art

A major breakthrough in this safety field was the invention of the barrier device. A good example of such a device is disclosed in U.S. Pat. No. 3,527,985, entitled "Electrical Barrier Device" filed on Oct. 27, 1967, claiming the priority of an earlier filed British patent. Additional examples of barrier devices are found in U.S. Pat. No. 3,614,539 and British Pat. No. 977,913.

Barrier devices, as described in the above-referenced patent, are useable to limit the power only in one line. Installations containing barrier devices are both costly and complex because a separate barrier device is required for each connection to the field. The devices must also be individually tested periodically to insure that they will in fact be capable of limiting the power sent to the field.

An alternate method known in the art is to employ dedicated power sources having internal voltage and current limiting devices. This approach places severe limitations upon system configurations and flexibility and requires that more than one power supply be used within the control room area. This method is often combined with circuitry used to limit the energy transmittable along the individual connections to the field. Examples of this are shown in U.S. Pat. No. 3,624,449.

SUMMARY OF THE INVENTION

According to the invention, the difficulties and complexities involved in a process control system utilizing known barrier devices may be avoided by eliminating the requirement for individual barrier devices in each connection to the field. This goal is achieved by using a process control system configuration that provides separate voltage and current limiting. A single power source may be used thereby allowing flexibility in the system configuration.

In particular, the objects of this invention are accomplished by utilizing a voltage limiting barrier and current limiting devices in each signal path leading to the field.

The process control system includes an interface between process and control areas. The voltage limiting barrier is associated with the interface. It is bidirectional in that in addition to limiting the voltage output of the power source it is capable of preventing a fault occurring in a control room device from feeding power to the field through the power source. This is accomplished by supplying the two sides of the interface with power along separate cables joined only at the voltage limiting barrier.

PREFERRED EMBODIMENT OF THE INVENTION

FIG. 1

Figure 1:
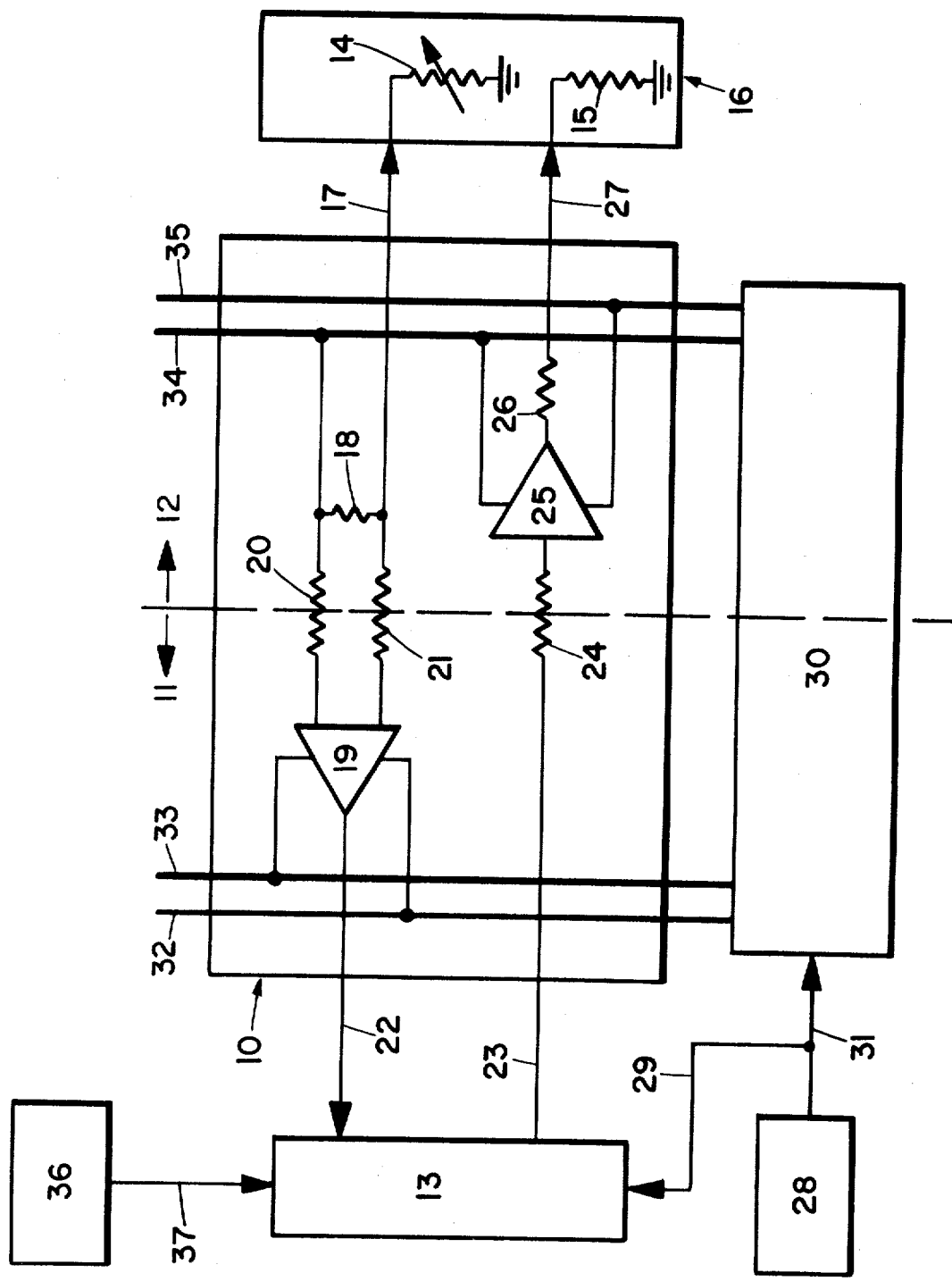
FIG. 1 is a representation in simplified form of a complete process control system configuration containing a preferred embodiment of the invention.

FIG. 1 is a representation in block diagram form of a preferred embodiment of the instant invention. The system shown includes recording, controlling and display instruments connected through an interface to the process or field area. The hazardous area previously described is included in the field area.

Within the interface are contained a plurality of signal processing circuitry, representative elements of which are shown for ease of explanation. The field area contains a plurality of devices, such as temperature, pressure or flow transmitters, for measuring the parameters of the process, and also devices for manipulating the process such as valves and valve positioners, heaters and relays, pumps and transducers, and the like.

In order to more easily understand the instant invention both the measuring and the manipulating devices in the field may be viewed as resistance elements. This representation is useful because the electric power required for the operation of these field devices is transmitted to them from the control room area through the interface over the same paths that carry the signal information. The motive power for some of the field devices is non-electric, e.g. pneumatic, but is controlled by electric transducers so the representation is still appropriate.

Referring now in greater detail to FIG. 1, interface 10 is divided into two portions, control room side 11 and field side 12. The instruments and devices previously mentioned in the control room area are represented by instrument block 13 and are connected to control room side 11 of interface 10. The devices for measuring and manipulating the process are shown as transmitter 14 and valve positioner 15 contained in field area 16. These devices are connected to the field side 12 of interface 10.

A representative field measurement signal appears as a change in the effective resistance of transmitter 14 and is communicated to the interface on line 17, which is in series with resistor 18 in the field side 12 of interface 10 and a source of power. The measurement signal is detected as a change in voltage across resistor 18 by differential amplifier 19 whose input resistors 20 and 21 are connected to opposite ends of resistor 18. The signal processed by amplifier 19 is transmitted to control instruments 13 via line 22.

A representative control signal originating in control instruments 13 is connected to the control room side 11 of interface 10 via line 23. Line 23 is in series with input resistor 24 of amplifier 25. The signal processed by amplifier 25 is transmitted to positioner 15 in field 16 through output resistor 26 via line 27.

The purpose of the above-described configuration is to prevent ignition in the potentially hazardous areas in field 16 by limiting the power that may be transmitted to field 16 over lines 17 and 27. This power limiting feature must be effective during normal operation of system and must also be capable of limiting the power available to the field when fault conditions occur.

There are two potential sources of power sufficient to cause ignition. The first is the power source used to supply the normal power requirements of the field devices, the interface devices and the control instruments. This source is shown in FIG. 1 as power supply 28 which is connected to instruments 13 via cable 29 and also to barrier 30 via cable 31.

Barrier 30 distributes the power from supply 28 to interface 10 via two sets of busses. The first set of busses supplying power to the control room side 11 of interface 10 include busses 32 and 33 carrying the two separate voltage levels required by many modern electronic components such as integrated circuitry amplifiers. The corresponding set of busses serving the field side of interface 10 are shown as busses 34 and 35.

It is important to note that signal processing amplifiers 19 and 25 are shown as representative portions of interface 10 which may contain a multitude of such devices, each of which would be connected to field 16, instruments 13 and barrier 30 in the manner depicted in FIG. 1 and described hereinabove.

Another potential source of power that may cause ignition in the field during fault conditions is shown in FIG. 1 as secondary power source 36. Power source 36 is connected to control instruments 13 via cable 37 and represents any source of power, including line voltage, that may contact any of the control room instruments during a fault condition or a combination of fault conditions.

Power from source 36 could reach field 16 to cause ignition via two possible routes. The first route would be through signal paths 22 and 23. This power could reach the field directly through the electronic circuitry contained in interface 10 or even via barrier 30 by reaching busses 32 and 33 and feeding through barrier 30 to busses 34 and 35 and then to the field.

The second route by which power from source 36 could conceivably reach field 16 would be via cable 37 to instruments 13 then over cables 29 and 31 to barrier 30 and from barrier 30 to lines 17 and 27 over busses 34 and 35.

Although it is apparent from the above description that some of the combinations of faults required to allow ignition in the field are extremely unlikely to occur the great hazards to personnel and equipment involved in dealing with the previously mentioned inflammable gases and vapors necessitate protection against combinations of events having very low probabilities of occurrence.

The instant invention insures against the application of sufficient levels of power on the leads connected to field 16, shown representatively as leads 17 and 27, in the following manner. Current limiting resistors 20, 21 and 24 serve to limit the current available to field side 12 of interface 10 from control side 11. Barrier 30 serves to limit the voltage available to field side 12 of interface 10 on busses 34 and 35. The details of barrier 30 will be described below in reference to FIG. 2.

Power source 28 supplies power directly to instruments 13, and through barrier 30 to interface 10. During normal operation power is supplied to interface 10 on cable 31. If a fault occurs in control instruments 13, power from source 36 may also be applied to cable 31 via cable 29. Barrier 30 serves as a voltage limiter on cable 31 to prevent an overvoltage in sources 28 or 36 appearing on cable 31 from reaching interface 10 through busses 32, 33, 34 or 35. This function is accomplished with the voltage limiting circuits shown in FIG. 2. In this embodiment three identical voltage limiting circuits 37, 38 and 39 are shown in parallel. Although each circuit is capable of performing the required voltage limiting function alone, the redundant circuits serve to insure the performance of this function in the event of a fault condition within barrier 30.

FIG. 2

Figure 2:
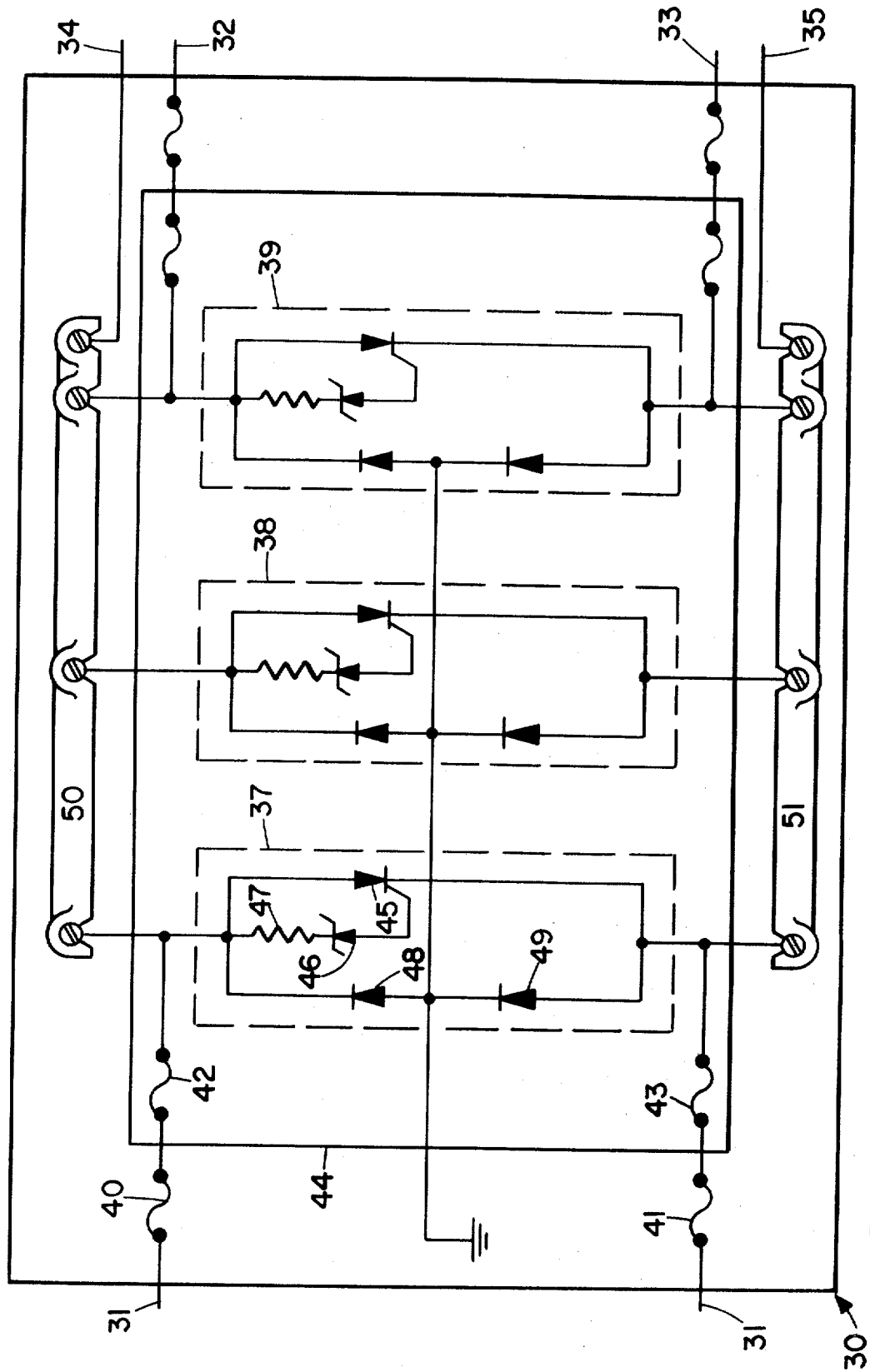
FIG. 2 is a representation in schematic form of the voltage limiting barrier outlined in FIG. 1.

FIG. 2 is a schematic representation of barrier 30 discussed above. Barrier 30 receives power via cable 31 through fuses 40 and 41, one per input line. These fuses are in series with fuses 42 and 43 respectively which are enclosed in area 44. Area 44 outlines the portion of barrier 30 that may be conveniently potted or otherwise protected from the environment, if desired. The fuses serve to protect barrier 30 from overload during fault conditions. Two fuses are employed in series in each line so that they may have different ratings. The different rated fuses in series insure that the fuses will be obtained from different manufacturing batches. This provides reasonable assurance that they will not both be defective. The lower rated fuses (40 and 41) are in barrier 30 but outside of pottable area 44. In this way, if necessary, a fuse may be replaced without disturbing the integrity of area 44 if potted or otherwise protected.

Fuses 42 and 43 are connected to opposite ends of the three parallel voltage limiting circuits. One of these, limiter 37 will be described below in detail.

The main voltage limiting function is provided by silicon controlled rectifier (SCR) 45 connected across the supply line. When the voltage on cable 31 exceeds a predetermined value, SCR 45 is triggered and acts as a short circuit across the supply line reducing the voltage to less than 1 volt.

The gate of SCR 45 is connected to a series combination of Zener diode 46 and resistor 47 which provide temperature compensation for SCR 45 and determine the voltage at which SCR 45 will fire. The arrangement of components within circuit 37 allows overvoltage protection to be provided for the differential voltage between the positive and negative terminals of a power supply with only one SCR.

The series combination of diodes 48 and 49, connected in parallel with SCR 45 and center tapped to ground, provide a steering function to reference SCR 45 to ground with respect to the two leads in cable 31.

As shown in FIG. 2 voltage limiting circuits 37, 38 and 39 are connected in parallel by jumpers 50 and 51 to which are connected busses 34 and 35 respectively. These jumpers are removable to facilitate testing of the individual limiting circuits.

Busses 32 and 33, which supply power to the control room side of interface 10, are each connected to limiter 39 by a pair of series fuses having the same functions as fuses 40 through 43 described hereinabove.

By utilizing separate sets of busses to supply power to the control room and field side of interface 10, barrier 30 is able to prevent an overvoltage appearing on busses 32 and 33, from another source such as power source 36, from appearing on busses 34 and 35 which communicate with field 16.

Although a preferred embodiment of the invention has been described, it is obvious that variations and alterations may be made in the embodiment shown without departing from the spirit or scope of the invention. The current limiting devices shown in FIG. 1 are shown as resistors, but other devices such as optical isolation devices will serve equally well. The measuring devices might be thermocouples, contact closures, or frequency devices. Therefore, the electronic configuration of the interface depends upon the measurement and control instruments employed. The circuitry of FIG. 2 may be replaced by many known overvoltage circuits without changing the basic invention. It is only necessary to provide resistance means in an interface area and a voltage barrier as hereinabove described to practice the instant invention.

We claim:

1. An improved process control system of the type normally having control, record and measurement instruments together with a power source in a control room communicating with instruments in a process area, wherein the improvement for adapting the system for use in hazardous areas comprises:
    an interface for limiting the current in all signal paths leading to and from the process area, and
    a voltage limiter between the power source and the interface for limiting the voltage supplied to the interface means.

2. The improved process control system as claimed in claim 1 wherein the interface includes:
    amplifiers for processing signals being sent to and from the process area, and
    resistors for current limiting associated with the input side of each amplifier.

3. The improved process control system as claimed in claim 1 wherein the interface comprises:
    a control room portion,
    a process area portion,
    input resistors for signals originating in the process area in said process area portion,
    amplifiers for signals originating in the process area in said control room portion,
    input resistors for signals originating in the control room in said control room portion, and
    amplifiers for signals originating in the control room in said process area portion.

4. The improved process control system as claimed in claim 3 wherein the voltage limiter includes;
    a first cable for receiving power from the power source,
    a second cable for supplying power to the control room portion of the interface means, and
    a third cable for supplying power to the process area portion of the interface means.

5. The improved process control system as claimed in claim 3 wherein the voltage limiter further includes;
    series fuses of different values in said first and second cables.

6. An intrinsically safe interface assembly for use between a control area containing instrumentation and a process area containing field devices in a hazardous atmosphere, comprising:
    a control room side connected to the control area;
    a field side for providing signal and power connections to the process area;
    impedance devices connecting the control room side and the field side for limiting the current transferred therebetween; and
    a bi-directional voltage barrier for limiting the voltage applied to the interface having an input to which a source of power may be applied, a first output connected to the control room side and a second output connected to the field side, the voltage limit of the barrier being determined by the current limit of the impedance devices so that the energy transmitted to the process area is constrained below the level required for ignition of the hazardous atmosphere even during conditions of failure of any device in the power source, the control area, and the control room side and field side of the interface.

7. The interface assembly of claim 6 wherein the barrier comprises:
    an SCR connected across the input of the barrier, and
    a triggering circuit connected thereto for sensing the voltage applied to the input and causing the SCR to conduct when the voltage limit is exceeded.

8. The interface assembly of claim 7 wherein the barrier further comprises:
    a first set of fuses in each input selected to burn out when the SCR begins to conduct.

9. The interface assembly of claim 8 wherein the barrier further includes a second set of fuses in series with the first set selected to burn out when the SCR conducts for a predetermined time.

10. The interface assembly of claim 9 wherein the SCR, triggering a circuit and second set of fuses are potted for environmental protection, whereby the barrier may be reused after the SCR was caused to conduct by replacement of the first set of fuses.

* * * * *